ered by the United States
United States Patent [19]
Travelli

[11] Patent Number: 4,720,370
[45] Date of Patent: Jan. 19, 1988

[54] NUCLEAR REACTOR FUEL STRUCTURE CONTAINING URANIUM ALLOY WIRES EMBEDDED IN A METALLIC MATRIX PLATE

[75] Inventor: Armando Travelli, Hinsdale, Ill.

[73] Assignee: The United States of America as represented by the United States Department of Energy, Washington, D.C.

[21] Appl. No.: 791,235

[22] Filed: Oct. 25, 1985

[51] Int. Cl.⁴ ............................................. G21C 3/36
[52] U.S. Cl. ................................. 376/422; 376/432; 376/901; 252/637; 420/3
[58] Field of Search .............. 376/432, 901, 421, 409, 376/422; 252/637, 640, 636; 420/3

[56] References Cited
U.S. PATENT DOCUMENTS

| | | |
|---|---|---|
| 2,758,023 | 8/1956 | Bareis ......................... 420/3 X |
| 2,986,504 | 5/1961 | Goslee et al. ............... 376/432 X |
| 3,093,566 | 6/1963 | Currier, Jr. et al. .......... 376/432 X |
| 3,135,665 | 6/1964 | Koutz et al. . |
| 3,141,227 | 7/1964 | Klepfer et al. . |
| 3,147,191 | 9/1964 | Crowther . |
| 3,175,955 | 3/1965 | Cheverton ..................... 376/432 X |
| 3,274,068 | 9/1966 | Koutz et al. . |
| 3,545,966 | 12/1970 | Colombie et al. ............. 420/3 X |
| 3,564,704 | 2/1971 | Feraday ......................... 376/422 X |
| 4,038,135 | 7/1977 | Bergougnoux et al. . |
| 4,113,563 | 9/1978 | Tobin . |
| 4,224,106 | 9/1980 | Delafosse . |

Primary Examiner—Richard D. Lovering
Assistant Examiner—John S. Maples
Attorney, Agent, or Firm—Hugh W. Glenn; Robert J. Fisher; Judson R. Hightower

[57] ABSTRACT

A flat or curved plate structure, to be used as fuel in a nuclear reactor, comprises elongated fissionable wires or strips embedded in a metallic continuous non-fissionable matrix plate. The wires or strips are made predominantly of a malleable uranium alloy, such as uranium silicide, uranium gallide or uranium germanide. The matrix plate is made predominantly of aluminum or an aluminum alloy. The wires or strips are located in a single row at the midsurface of the plate, parallel with one another and with the length dimension of the plate. The wires or strips are separated from each other, and from the surface of the plate, by sufficient thicknesses of matrix material, to provide structural integrity and effective fission product retention, under neutron irradiation. This construction makes it safely feasible to provide a high uranium density, so that the uranium enrichment with uranium 235 may be reduced below about 20%, to deter the reprocessing of the uranium for use in nuclear weapons.

12 Claims, 4 Drawing Figures

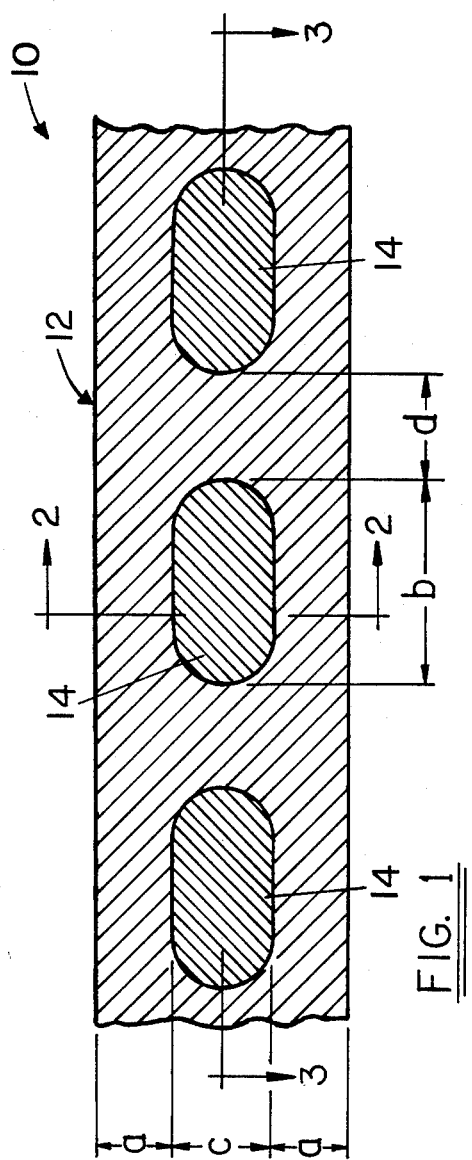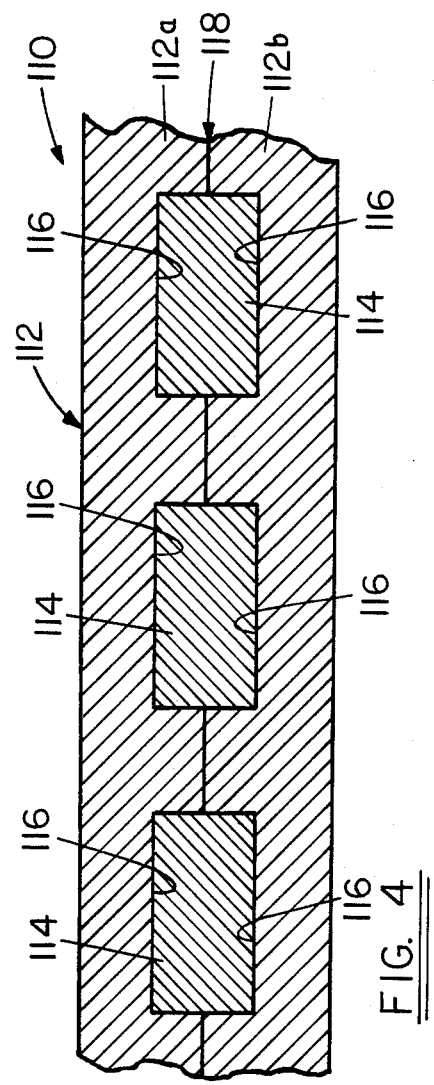

NUCLEAR REACTOR FUEL STRUCTURE CONTAINING URANIUM ALLOY WIRES EMBEDDED IN A METALLIC MATRIX PLATE

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

FIELD OF THE INVENTION

This invention relates to nuclear fuel-containing plate structures for use in nuclear fission reactors.

BACKGROUND OF THE INVENTION

In certain known types of nuclear fission reactors, particularly research reactors, it is known to employ nuclear fuel-containing plate structures to provide the fissionable nuclear fuel, such as uranium or uranium compounds, enriched with uranium 235. In such known plate structures, a fissionable fuel material or "meat" is sandwiched between aluminum cladding plates which afford structural support and containment for the fission products.

In some cases, a homogeneous uranium-aluminum alloy has been used for the "meat". This material has excellent behavior under neutron irradiation, in that the material does not swell up or otherwise cause trouble, but this material is limited to a very low uranium density of approximately 1.3 grams of uranium per cubic meter. Because of the low uranium density, it has generally been necessary to use uranium having a high percentage of enrichment with uranium 235. The high enrichment percentage has the disadvantage that the uranium can readily be reprocessed for use in nuclear weapons.

More recently, dispersion fuels have been used to obtain higher uranium densities in the "meat". To produce such dispersion fuels, fine powders of aluminum and uranium-bearing compounds have been mixed together and pressed to form the "meat". The uranium densities thus achieved depend on the choice of the uranium-bearing compound and on its volumetric fraction in the fuel "meat". The largest uranium density achieved in commercially produced dispersion fuels has been about 1.7 grams of uranium per cubic meter. Work is underway to produce improved dispersion fuels having higher uranium densities.

The low uranium densities, mentioned above, give rise to the problem that is generally necessary to employ uranium having a high percentage of enrichment with uranium 235, so that the uranium can readily be reprocessed for use in nuclear weapons. It is desirable to reduce the enrichment percentage below about 20% to deter the reprocessing of the uranium for use in nuclear weapons.

SUMMARY OF THE INVENTION

It is the general object of the present invention to provide new and improved nuclear fuel-containing plate structures having increased uranium density, as well as excellent structural integrity and effective containment of the nuclear fission products.

A particular object is to provide new and improved nuclear fuel-containing plate structures which afford sufficiently great uranium densities to enable the reduction of the enrichment percentage below 20%. In this way, the reprocessing of the uranium for use in nuclear weapons is deterred.

To achieve these and other objects, the present invention provides a nuclear fuel-containing plate structure for a nuclear reactor, such structure comprising a continuous metallic non-fissionable matrix plate member, and a plurality of continuous elongated wire-like fissionable fuel members embedded in the matrix plate member to afford a high fuel density as well as structural integrity and effective retention of fission products.

The wire-like fissionable fuel members are preferably made of a malleable uranium alloy capable of being formed into continuous elongated wire-like members.

Such alloy may comprise predominantly uranium silicide ($U_3Si$), or alloys of uranium with gallium or germanium. The latter alloys may be referred to as uranium gallide ($U_3Ga$) and uranium germanide ($U_3Ge$).

The continuous elongated wire-like fissionable fuel members may take the form of wires or rods, made predominantly of malleable uranium alloys, and formed by rolling, drawing or extruding processes. Alternatively, the continuous elongated wire-like fissionable fuel members may take the form of elongated strips of sheet material, made predominantly of malleable uranium alloys, which may be rolled to form sheet material, from which the strips are cut.

The matrix plate member is preferably made predominantly of aluminum, or an aluminum alloy, which may, for example, contain magnesium, for increased strength.

The aluminum matrix plate member may be coextruded with the uranium alloy wires, whereby the wires are separately embedded in the matrix plate member.

As another alternative, the matrix plate member may comprise a plurality of plate elements bonded together and having the fissionable fuel members sandwiched and embedded between the plate elements. When made predominantly of aluminum or an aluminum alloy, the plate elements can be bonded securely together by pressure bonding, so that the plate elements are effectively welded together or unified. Recesses may be preformed in the plate elements to receive the wire-like fuel members.

The wire-like fissionable fuel members are preferably substantially parallel with one another and are separately embedded in the matrix plate member. It is also preferable that the wire-like members be substantially parallel with the length dimension of the matrix plate member.

The elongated wire-like fissionable fuel members are preferably made with sufficiently large cross-sectional dimensions so that each of the wire-like members has an outer surface area per unit volume less than about 3,400 $m^{-1}$. The length of the wire-like members is sufficiently great so that the surface area per unit volume is determined primarily by the cross-sectional dimensions.

With the nuclear fuel-containing plate structure of the present invention, the fissionable fuel members contain uranium affording a high uranium density of approximately 9 grams of uranium per cubic meter. This high uranium density makes it possible to reduce the enrichment percentage below about 20% of uranium 235 in reactors in which otherwise this reduction could not take place. This low enrichment percentage deters the reprocessing of the uranium for use in nuclear weapons.

BRIEF DESCRIPTION OF THE DRAWINGS

Further objects, advantages and features of the present invention will appear from the following description, taken with the accompanying drawings, in which:

FIG. 1 is a greatly enlarged fragmentary cross section taken through a nuclear fuel-containing plate structure, to be described as an illustrative embodiment of the present invention.

FIG. 4 is a cross section, similar to FIG. 1, but showing a modified nuclear fuel-containing plate structure, to be described as another illustrative embodiment of the present invention.

DETAILED DESCRIPTION OF ILLUSTRATIVE EMBODIMENTS

Figure 2:
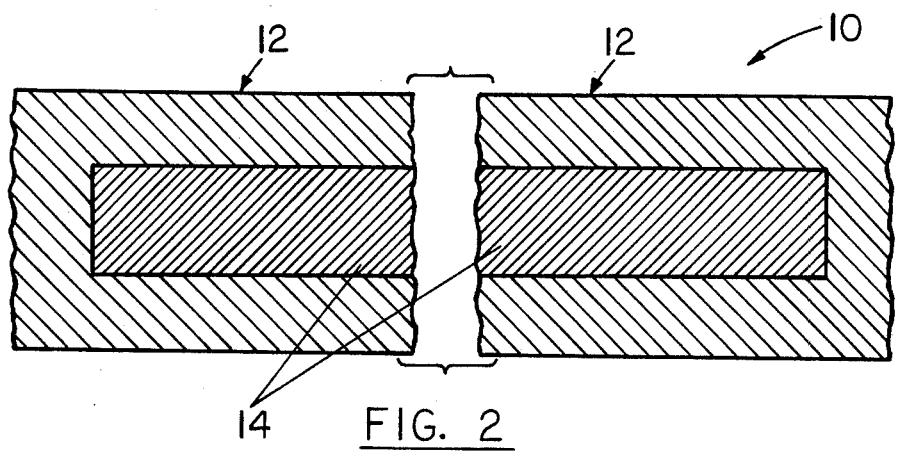
FIG. 2 is a fragmentary longitudinal section, taken generally as indicated by the line 2—2 in FIG. 1, along a section plane which is parallel with the thickness dimension and the length dimension of the plate structure.
Figure 3:
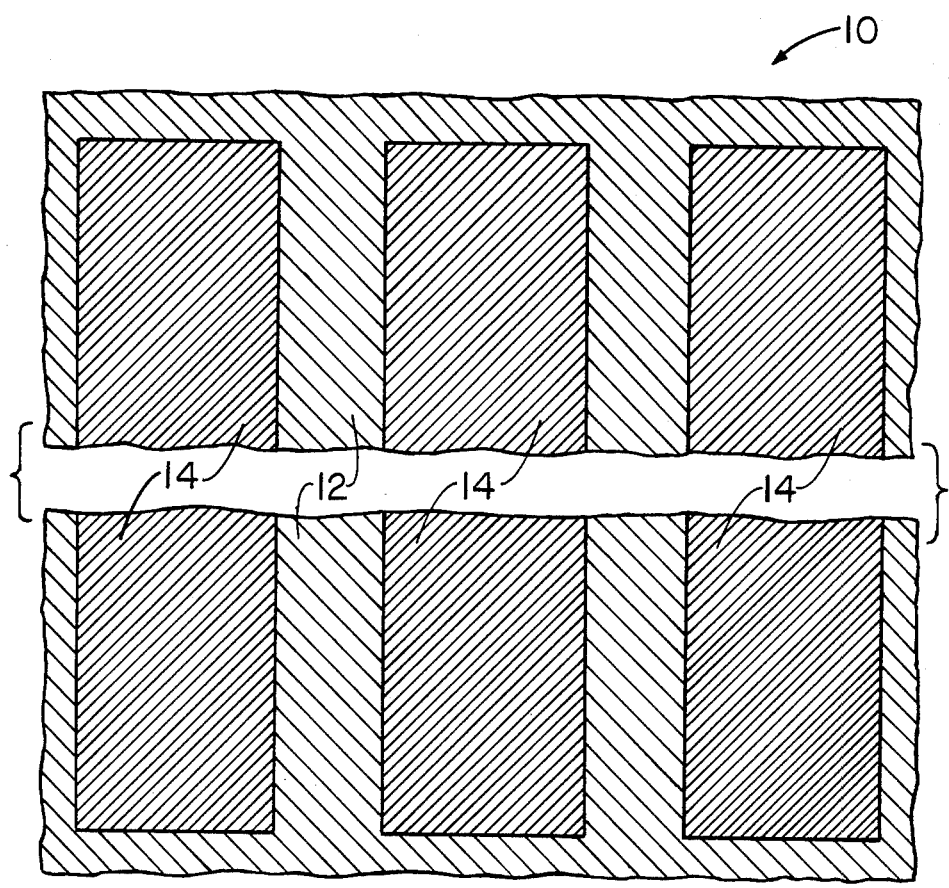
FIG. 3 is a rectangularly related longitudinal section, taken generally as indicated by the line 3—3 in FIG. 1, along a section plane which is parallel with the width dimension and the length dimension of the plate structure.

As just indicated, FIGS. 1-3 are greatly enlarged diagrammatic sectional views taken through a nuclear fuel-containing plate structure 10 for use in a nuclear fission reactor. Earlier types of nuclear fuel-containing plate structures have been previously used in certain types of nuclear fission reactors, particularly reactors intended for research purposes. If desired, the plate structure 10 of the present invention may be employed as a direct replacement for earlier plate structures.

The fuel-containing plate structure 10 comprises a continuous metallic non-fissionable matrix plate member 12, preferably made predominantly of aluminum or an aluminum alloy, to afford structural strength and the ability to withstand intense neutron radiation, while affording a low absorption of neutron radiation. When the matrix plate 12 is made of an aluminum alloy, such alloy may advantageously include magnesium for added strength.

The plate structure 10 comprises a plurality of continuous elongated wire-like fissionable fuel members 14 embedded in the matrix plate member 12. This construction affords a high fuel density as well as structural integrity and effective retention of fission products.

The wire-like fissionable fuel members 14 are preferably made of a malleable uranium alloy capable of being formed into continuous elongated wire-like members. In FIG. 1, the wire-like members are shown in the form of actual wires which are generally oval-shaped in cross-section, although they may have any other suitable cross-sectional shape, such as round, square or rectangular, for example. When in the form of wires, the wire-like members 14 may be formed from the malleable uranium alloy by various suitable processes, such as rolling, drawing or extruding.

One preferred uranium alloy predominantly comprises uranium silicide ($U_3Si$) which is a malleable alloy of uranium and silicon. In another preferred embodiment, the uranium alloy predominantly comprises an alloy of uranium with gallium. Such alloy may also be referred to as uranium gallide ($U_3Ga$). In still another preferred embodiment, the uranium alloy comprises a malleable alloy of uranium with germanium. Such alloy is also referred to as uranium germanide ($U_3Ge$).

The malleable uranium alloys make it possible to form the wire-like fissionable fuel members 14 as continuous homogeneous members of very substantial cross-sectional size, so that the plate structure 10 has a high uranium density, which may be about 9 grams per cubic meter. Such uranium density values are far higher than the values provided by earlier commercially manufactured plate structures containing fissionable material or "meat" comprising powdered uranium or uranium compounds, usually mixed with other powdered materials, such as aluminum.

The provision of high uranium density makes it possible to decrease the enrichment percentage of the uranium, so that the percentage of enrichment with uranium 235 can be reduced below about 20%. Such low enrichment values deter the reprocessing of the uranium for use in nuclear weapons.

The dimensions of the nuclear fuel-containing plate structure 10 may be widely varied. However, it is believed that it will be helpful to give one set of dimensional values, by way of example. Certain of the cross-sectional dimensions are labeled a, b, c and d in FIG. 1. These dimensional values, specified by way of example, may be approximately as follows:

Embedding depth a=0.015" (0.75 mm.)
Wire width b=0.040" (1.0 mm.)
Wire thickness c=0.020" (0.5 mm.)
Wire spacing d=0.020" (0.5 mm.)

Other dimensions of the plate structure 10, also specified by way of example, may be approximately as follows:

Total plate structure thickness: 0.050" (1.25 mm.)
Plate structure width: 2.500" (6.6 cm.)
Plate structure length: 2' (61 cm.)

It is advantageous to make the wire-like fissionable fuel members 14 with substantial cross-sectional dimensions, because making these dimensions large increases the uranium density of the plate structure 10. Moreover, increasing the cross-sectional dimensions of the wire-like members 14 has the advantageous effect of decreasing the outer surface area per unit volume of the wire-like members. It is preferred to make the cross-sectional dimensions of the wire-like members sufficiently large to reduce the outer surface area per unit volume to values less than about 3,400 $m^{-1}$ and to limit possible reactions between matrix and wires. The length of the wire-like members 14 is much greater than the cross-sectional dimensions, so that the length is not a significant factor in determining the value of the surface area per unit volume. Such value is determined almost entirely by the cross-sectional dimensions of the wire-like members 14.

Various processes may be employed to make the plate structure 10, with the wire-like fissionable fuel members 14 embedded in the matrix plate member. For example, the matrix plate member 12 and the wire-like members 14 may be coextruded, so that the wire-like members 14 are directly embedded in the matrix plate member 12.

Another method is to form the wire-like fuel members 14 separately, by methods such as rolling, drawing or extruding. The matrix plate member 12 may be laminated, in that the plate member 12 may be formed initially as two separate laminae or plate elements, which may be bonded together, with the wire-like members 14 sandwiched therebetween. The laminae may be bonded together by pressure bonding, which is a known process for bonding aluminum and aluminum alloys. The pressure bonding process may include suitable surface preparation, followed by pressure rolling.

Advantageously, the wire-like fuel members 14 are parallel with one another, and also parallel with the length dimension of the plate structure 10, as shown in FIGS. 1, 2 and 3.

The nuclear fuel-containing plate structure 10 of FIGS. 1–3 is highly advantageous, in that such plate structure affords high uranium density, as well as a high order of structural integrity and highly effective retention of the fission products.

FIG. 4 illustrates a modified nuclear fuel-containing plate structure 110, constituting a second illustrative embodiment of the present invention. The plate structure 110 comprises a continuous metallic non-fissionable matrix plate member 112, and a plurality of continous elongated wire-like fissionable fuel members 114 embedded in the matrix plate member 112. In most respects, the plate structure 110, the matrix plate member 112, and the wire-like members 114 are the same as the corresponding components of FIGS. 1–3. The reference characters employed in FIG. 4 have been increased by 100, so that the preceding description, directed to FIGS. 1–3, can readily be applied to FIG. 4, so that the preceding description need not be repeated. Except for the differences to be described presently, the preceding description of FIGS. 1–3 is fully applicable to the plate structure 110 of FIG. 4.

FIG. 4 is a cross-sectional view of the modified plate structure 110. The longitudinal sections of FIGS. 2 and 3 are fully applicable to the plate structure 110 of FIG. 4.

In the modified plate structure 110 of FIG. 4, the wire-like fissionable fuel members 114 are in the form of continous elongated strips of homogeneous sheet material, which may be formed by rolling a malleable uranium alloy, such as uranium silicide, uranium gallide or uranium germanide. The wire-like members 114 may then be cut as elongated strips from the sheet material. A slitting or shearing process may be employed to cut the elongated strips from the sheet material.

In the plate structure 110 of FIG. 4, the matrix plate member 112 is laminated, in that it comprises two laminae or plate elements 112a and 112b. The two laminae are the same in construction. Preferably, the laminae 112a and 112b are preformed with recesses 116 for receiving the wire-like strip members 114. A pressure die forming method may be employed to form the recesses 116.

After the recesses 116 have been formed, the wire-like strip members 114 are assembled in the recesses 116, and the laminae 112a and 112b are pressure bonded together along a bonding plane or interface 118. Pressure bonding of aluminum and aluminum alloys is a well known process, whereby the two laminae become securely bonded or welded together, so that they are effectively unified. Thus, the wire-like fuel members 114 are securely retained and sealed between the unified laminae 112a and 112b of the matrix plate member 112.

In both embodiments, the wire-like fuel members 14 and 114 are separately or individually embedded in the respective matrix plate members 12 and 112. The wire-like members 14 and 114 may have any desired cross-sectional shape, such as oval, rectangular, square or circular. The dimensions of the wire-like members 14 and 114 may be widely varied as to width, thickness, diameter and length. Similarly, the dimensions of the matrix plate member 12 may be widely varied as to thickness, width and length. The breaks shown in FIGS. 2 and 3 are intended to indicate that the matrix plate member 12 and the wire-like fuel members 14 may be of any desired length. This is also true of the corresponding members 112 and 114 of FIG. 4.

The plate structures 10 and 110 may be either flat or curved, to suit the nuclear reactor in which the plate structures are to be used. Earlier types of plate structures have been flat in some cases and curved in other cases. When a curved plate structure is desired, the matrix plate member 12 or 112 is correspondingly curved.

The plate structures 10 and 110 of the present invention have excellent structural integrity and excellent retention of fission products, so as to obviate any problems, such as swelling, which might otherwise be encountered, due to the high uranium density, when subjected to neutron irradiation.

The provision of the wire-like fuel members makes it possible to achieve reduced values of surface area per unit volume. Such reduced values also reduce the tendency of the fuel material to swell due to high neutron irradiation in a nuclear reactor.

The high uranium density, achieved by the present invention, makes it possible to reduce the uranium enrichment below about 20% of uranium 235. The low level of uranium enrichment effectively prevents or deters the reprocessing of the unirradiated or spent fuel for use in nuclear weapons, so that the possible proliferation of nuclear weapons is effectively prevented or deterred.

In each of the plate structures 10 and 110 of FIGS. 1 and 4, the wire-like fuel members are located in a single row at the midsurface of the matrix plate member 12 or 112. The wire-like members are parallel to each other and in the direction of the largest dimension of the matrix plate member. The wire-like members are separated from each other, and from the surface of the matrix plate member, by thicknesses of matrix material which are sufficient to provide structural integrity and effective fission product retention capability under neutron irradiation. The configuration of the plate structures and the materials employed therein make it possible to safely include in the plate structures an amount of uranium greatly in excess of what is feasible with other concepts.

The width of the wire-like fuel members is preferably greater than the thickness thereof, to increase the uranium density without decreasing the clad thickness afforded by the embedding matrix plate member 12 or 112. The individual wire-like fuel members are separated by a matrix material thickness sufficient to ensure the structural integrity of the plate structure 10 or 110, under neutron irradiation. The physical separation of the wire-like fuel members and the provision of continuous embedding matrix material provide for excellent fission product retention capability.

The spacing or size of the wire-like fuel members need not be uniform, and variations in the spacing or size may be employed in some cases to compensate for variations in the thermal neutron flux in the reactor, so as to improve reactor performance.

Various modifications, alternative constructions and equivalents may be employed without departing from the true spirit and scope of the present invention as defined in the following claims.

I claim:

1. A nuclear fuel-containing plate structure for a nuclear reactor, such structure comprising a pair of malleable metallic non-fissionable matrix plates having confronting surfaces which are pressure bonded together and fully united to form a bonded interface, and a plurality of elongated malleable wire-like fissionable fuel members separately confined and fully enclosed between said matrix plates along said interface to afford a high fuel density as well as structural integrity and effective retention of fission products, said plates having separate recesses formed in said confronting surfaces for closely receiving said wire-like fissionable fuel members, said wire-like fissionable fuel members being made of a malleable uranium alloy capable of being formed into elongated wire-like members and capable of withstanding pressure bonding, said wire-like fissionable fuel members being completely separated and isolated by fully united portions of said interface.

2. A nuclear fuel-containing plate structure according to claim 1, in which said malleable uranium alloy comprises predominantly a malleable uranium silicide alloy ($U_3Si$).

3. A nuclear fuel-containing plate structure according to claim 1, in which said mallable uranium alloy comprises predominantly a malleable alloy of uranium with gallium.

4. A nuclear fuel-containing plate structure according to claim 1, in which said malleable uranium alloy comprises predominantly a malleable alloy of uranium with germanium.

5. A nuclear fuel-containing plate structure according to claim 1, in which said matrix plates are made predominantly of malleable aluminum metal.

6. A nuclear fuel-containing plate structure according to claim 1, in which said matrix plates are made predominantly of a malleable aluminum metal alloy.

7. A nuclear fuel-containing plate structure according to claim 1, in which said elongated wire-like fissionable fuel members take the form of elongated strips of sheet material made of said malleable uranium alloy.

8. A nuclear fuel-containing plate structure according to claim 1, in which each of said matrix plates has a thickness dimension, a width dimension substantially greater than said thickness dimension, and a length dimension substantially greater than said width dimension;

each of said wire-like fissionable fuel members having cross-sectional dimensions and a longitudinal dimension substantially greater than said cross-sectional dimensions, said wire-like fissionable fuel members being disposed with said longitudinal dimensions thereof substantially parallel with the length dimension of said matrix plates.

9. A nuclear fuel-containing plate structure for a nuclear reactor, such structure comprising a pair of malleable metallic non-fissionable matrix plates having confronting surfaces which are pressure bonded together and fully united to form a bonded interface, and a plurality of elongated malleable wire-like fissionable fuel members separately confined and fully enclosed between said matrix plates along said interface to afford a high fuel density as well as structural integrity and effective retention of fission products, said plates having separate recesses formed in said confronting surfaces for closely receiving said wire-like fissionable fuel members, said wire-like fissionable fuel members being made of a malleable uranium alloy capable of being formed into elongated wire-like members and capable of withstanding pressure bonding, said wire-like fissionable fuel members being completely separated and isolated by fully united portions of said interface, said malleable uranium alloy comprising predominantly a malleable uranium silicide alloy ($U_3Si$), each of said matrix plates having a thickness dimension and a width dimension substantially greater than said thickness dimension as well as a length dimension substantially greater than said width dimension, each of said wire-like fissionable fuel members having cross-sectional dimensions and a longitudinal dimension substantially greater than said cross-sectional dimensions, each of said wire-like fissionable fuel members being disposed with said longitudinal dimension substantially parallel with said length dimension of said matrix plates, said wire-like fissionable fuel members being substantially spaced apart from one another and being parallel with one another.

10. A nuclear fuel-containing plate structure according to claim 9.

in which said matrix plates are made predominantly of malleable aluminum metal.

11. A nuclear fuel-containing plate structure according to claim 9.

in which said matrix plates are made predominantly of a malleable alluminum metal alloy.

12. A nuclear fuel-containing plate structure according to claim 9 in which said elongated wire-like fissionable fuel members take the form of elongated strips of sheet material made of said malleable uranium silicide alloy.

* * * * *